US011833631B2

(12) United States Patent
Kamiura et al.

(10) Patent No.: US 11,833,631 B2
(45) Date of Patent: Dec. 5, 2023

(54) MAIN SPINDLE DEVICE FOR MACHINE TOOL

(71) Applicant: MAKINO J CO., LTD., Aikawa-machi (JP)

(72) Inventors: Seiji Kamiura, Aikawa-machi (JP); Motoki Murase, Aikawa-machi (JP)

(73) Assignee: MAKINO J CO., LTD., Aikawamachi (JP)

( * ) Notice: Subject to any disclaimer, the term of this patent is extended or adjusted under 35 U.S.C. 154(b) by 843 days.

(21) Appl. No.: 16/772,833

(22) PCT Filed: Dec. 15, 2017

(86) PCT No.: PCT/JP2017/045203
§ 371 (c)(1),
(2) Date: Jul. 21, 2020

(87) PCT Pub. No.: WO2019/116573
PCT Pub. Date: Jun. 20, 2019

(65) Prior Publication Data
US 2020/0353580 A1  Nov. 12, 2020

(51) Int. Cl.
*B23Q 1/70* (2006.01)
*B23Q 17/00* (2006.01)
*B23Q 17/22* (2006.01)

(52) U.S. Cl.
CPC ............ *B23Q 1/70* (2013.01); *B23Q 17/005* (2013.01); *B23Q 17/22* (2013.01); *B23Q 2220/006* (2013.01); *Y10T 409/309352* (2015.01)

(58) Field of Classification Search
CPC ............... B23Q 1/70; B23Q 2220/006; B23Q 17/002–17/006; B23Q 11/005;
(Continued)

(56) References Cited

U.S. PATENT DOCUMENTS 4,504,824 A * 3/1985 Mello ............... B23Q 17/003
408/6
5,002,442 A * 3/1991 Rutschle ........... B23Q 17/003
409/232
(Continued)

FOREIGN PATENT DOCUMENTS

CN       203109717 U     8/2013
JP    2005-103735 A  *  4/2005
(Continued)

OTHER PUBLICATIONS

International Search Report and Written Opinion dated Feb. 20, 2018, directed to International Application No. PCT/JP2017/045203, 11 pages.

*Primary Examiner* — Erica E Cadugan
(74) *Attorney, Agent, or Firm* — MORRISON & FOERSTER LLP (57) ABSTRACT

A main spindle device for a machine tool that checks the seating of a tool holder using compressed air, wherein the main spindle device for a machine tool comprises: a main spindle that has a distal end face in close contact with a flange end of the tool holder; an annular recess that is formed on the distal end face of the main spindle so as to be covered by the flange end of the tool holder; an air supply flow channel that is linked to the annular recess and that supplies compressed air to the annular recess; a compressed air source that supplies air to the air supply flow channel; and a pressure detector that detects the pressure of the compressed air in the air supply flow channel. The annular recess has a first section and a second section that is deeper than the first section, and the air supply flow channel is opened to the second section.

6 Claims, 10 Drawing Sheets

(58) Field of Classification Search
CPC ..... B23Q 11/006; Y10T 409/309352–309464; Y10T 408/94–957; Y10T 409/304088; Y10T 408/50; Y10T 483/15; B24B 14/04
USPC ....... 409/231–233, 137; 408/238–239 A, 67; 451/360–361, 363; 483/13
See application file for complete search history.

(56) References Cited

U.S. PATENT DOCUMENTS

| | | | | |
|---|---|---|---|---|
| 5,762,454 A | * | 6/1998 | Yamada | ............... B23Q 17/006 409/232 |
| 2011/0121521 A1 | * | 5/2011 | Fujimura | ............. B23Q 17/003 279/4.02 |

FOREIGN PATENT DOCUMENTS

| | | | |
|---|---|---|---|
| JP | 2009-226541 A | | 10/2009 |
| JP | 2017-159383 A | | 9/2017 |
| KR | 10-2013-0029549 A | * | 3/2013 |

* cited by examiner

RELATED ART

RELATED ART

MAIN SPINDLE DEVICE FOR MACHINE TOOL

CROSS-REFERENCE TO RELATED APPLICATIONS

This application is a U.S. national stage application under 35 USC 371 of International Patent Application No. PCT/JP2017/045203 filed Dec. 15, 2017, the entire contents of which are incorporated herein by reference.

FIELD OF THE DISCLOSURE

The present invention relates to a main spindle device of a machine tool.

BACKGROUND OF THE DISCLOSURE

In a machine tool such as a machining center, when automatically changing a tool, whether or not a tool holder is correctly attached to a main spindle is checked to confirm suitable seating. To confirm seating, in the past, a distal end face of the main spindle which a rear end face of a flange of the tool holder closely contacts is provided with a compressed air outlet. Compressed air is supplied from the inside of the main spindle through an air supply flow channel, and the pressure of the air inside the air supply flow channel is detected. That is, if the rear end face of the flange of the tool holder and the distal end face of the main spindle closely contact each other, the amount of air leaking out from between the two surfaces is very small, so the pressure of the air supply flow channel rises to a predetermined value in a short time. As a result, it is judged that the tool holder is suitably seated. As opposed to this, if foreign matter like a chip is caught between the rear end face of the flange of the tool holder and the distal end face of the main spindle and therefore the two surfaces do not closely contact, the amount of air leaking out becomes greater and the pressure of the air supply flow channel does not rise to the predetermined value, so it is judged that the tool holder is not suitably seated.

PTL 1 describes a clamp device able to confirm seating utilizing compressed air such as explained above. In the clamp device of PTL 1, aiming at supplying the necessary sufficient amount of air to the distal end face of the main spindle, the seating surface of the main spindle is formed with an arcuate or annular groove and the outlet of the air supply flow channel is opened at this groove.

PATENT LITERATURE

PTL 1 Japanese Unexamined Patent Publication No. 2017-159383

SUMMARY OF THE DISCLOSURE

The inventors of the present invention have discovered that by making the depth of the annular groove such as shown in PTL 1 shallower, it becomes possible to detect thin foreign matter in a relatively short time, but the problem of foreign matter causing the outlet of the air supply flow channel to be blocked easily arises. If the outlet of the air supply flow channel is blocked, the pressure inside the air supply flow channel rises to almost equal to the case where the seating is normal, so regardless of interposition of foreign matter, the control device may mistakenly judge that the seating is normal. As opposed to this, the inventors of the present invention have discovered that by making the depth of the annular groove deeper, the problem of foreign matter causing the outlet of the air supply flow channel to be block becomes less frequent but the time required for detection of thin foreign matter is increased.

The present invention is made in consideration of the above situation and has as its object the provision of a main spindle device of a machine tool able to raise a reliability of confirmation of seating without increasing the time required for confirmation of seating.

To achieve the above object, according to the present invention, there is provided a main spindle device of a machine tool using compressed air to confirm seating of a tool holder comprising a main spindle having a distal end face which a flange end face of the tool holder closely contacts, an annular recess formed at the distal end face of the main spindle so as to be covered by the flange end face of the tool holder, an air supply flow channel connecting with the annular recess and supplying the annular recess with compressed air, a compressed air source supplying air to the air supply flow channel, and a pressure detector detecting pressure of the compressed air inside the air supply flow channel, wherein the annular recess having a first section and a second section deeper than the first section, the air supply flow channel opening at the second section.

According to the present invention, when supplying compressed air to an air supply flow channel to confirm seating of a tool holder with respect to a main spindle, the effect of enabling even thin foreign matter to be detected in a short time and the effect of it becoming harder for an outlet to be blocked by foreign matter covering the outlet of the air supply flow channel, which in the past were in a tradeoff relationship, can both be achieved. Therefore, according to the present invention, it becomes possible to provide a main spindle device of a machine tool raising the reliability of confirmation of seating without lengthening the time required for confirmation of seating.

DETAILED DESCRIPTION OF THE DISCLOSURE

Figure 1A:
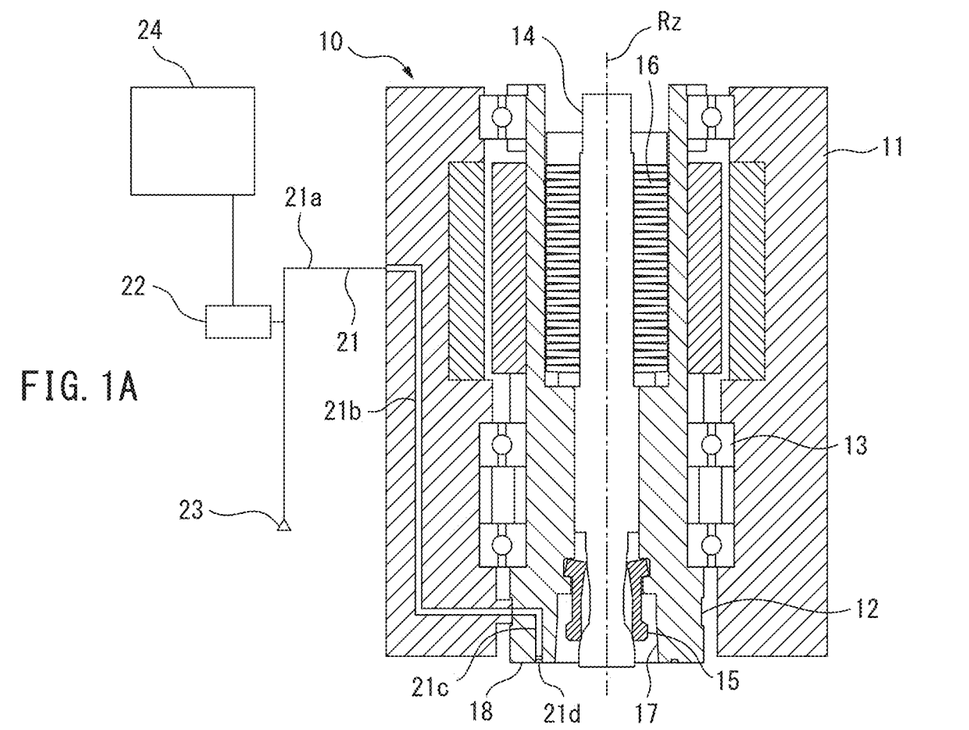
FIGS. 1A-1B give a longitudinal cross-sectional view (FIG. 1A) and distal end face view (FIG. 1B) of a main spindle device according to an embodiment of the present invention.
Figure 1B:
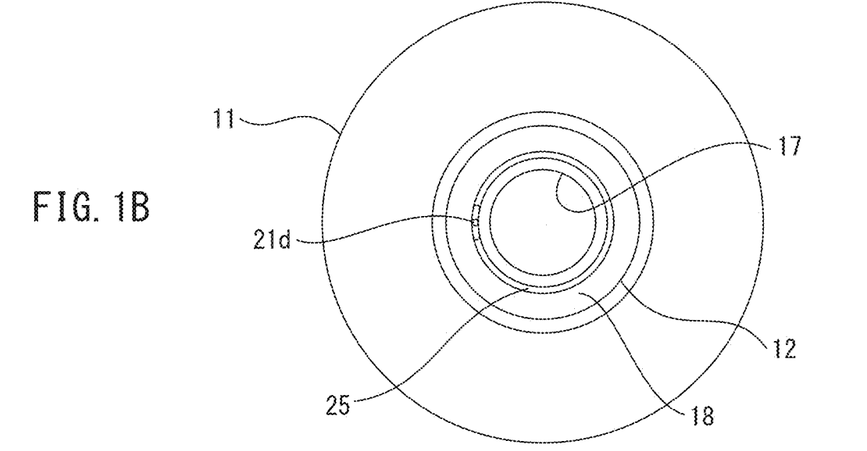

A main spindle device 10 of a machine tool according to an embodiment of the present invention will be explained below with reference to FIGS. 1A-1B to FIGS. 5A-5B. FIG. 1A is schematic longitudinal cross-sectional view of the main parts of the main spindle device of the machine tool (below, sometimes simply referred to as the "main spindle device") 10 according to the embodiment of the present invention to which an air supply circuit is added, while FIG. 1B is a view of the end face showing a distal end face 18 of the main spindle device 10. In the following explanation, the machine tool is a vertical machining center, but it is clear that the main spindle device 10 may, for example, be a main spindle device 10 of a horizontal machining center or other machine tool.

The main spindle device 10 is provided with a support member 11 supported by a column of the machine tool (not shown) to be able to move in a Z-axial direction, a main spindle 12 rotating about a rotational axis Rz extending in the Z-axial direction, a plurality of bearings 13 arranged between the support member 11 and the main spindle 12 and rotatably supporting the main spindle 12, a draw bar 14 arranged inside of the main spindle 12, a collet 15 arranged between the draw bar 14 and a tool holder 30, a plurality of dish springs 16 biasing the draw bar 14 upward in the Z-axial direction, a not shown actuator pushing the draw bar 14 downward in the Z-axial direction, etc. The main spindle device 10 in the present embodiment clamps the tool holder 30 with respect to the main spindle 12 by constraining the two surfaces.

Figure 2:
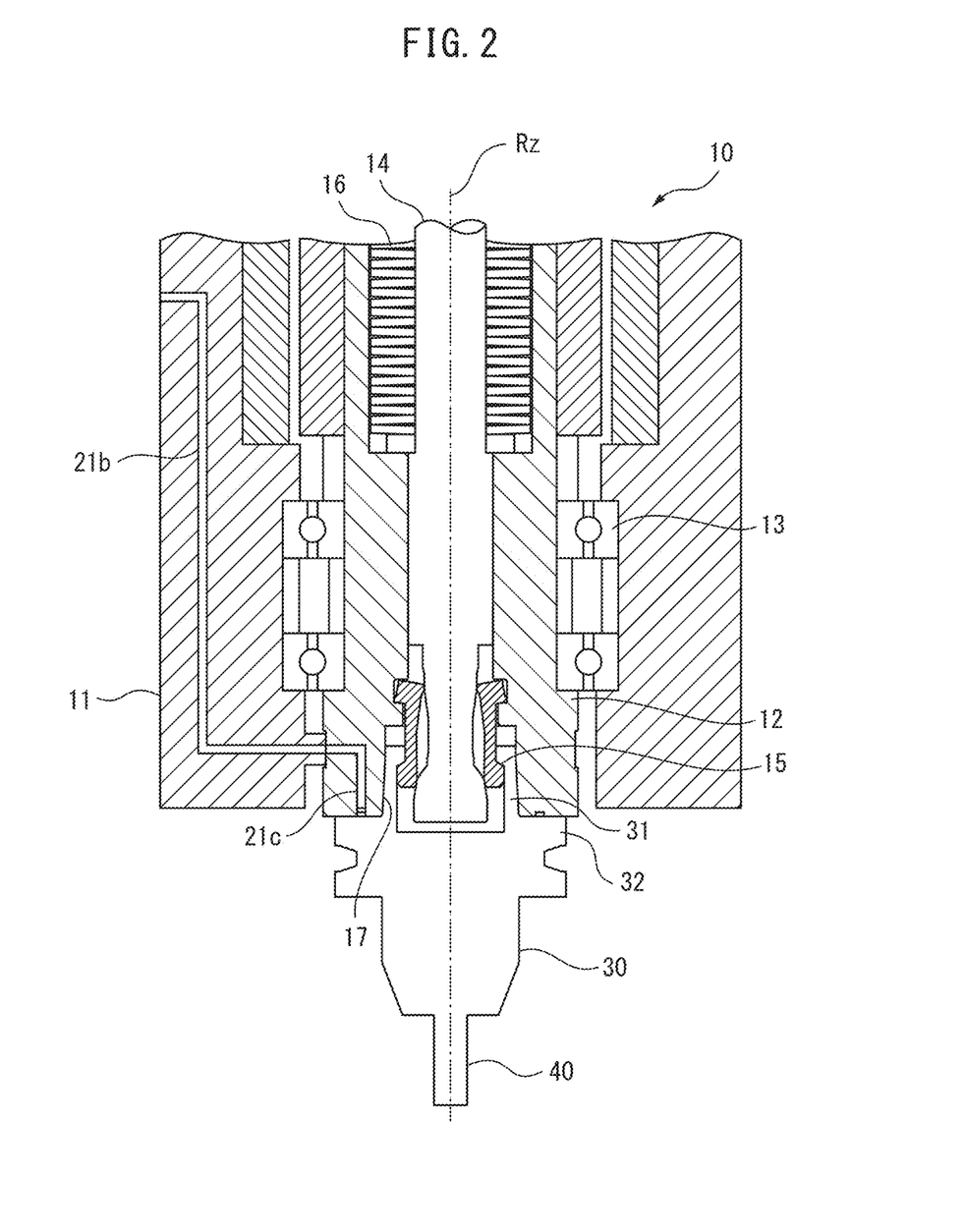
FIG. 2 is an enlarged view of key parts of the longitudinal cross-sectional view of FIG. 1A, in which view, a clamped tool holder is added.

FIG. 2 is a view similar to a view enlarging FIG. 1A. There, the tool holder 30 is clamped to the main spindle 12. The tool holder 30 in FIG. 2 is shown in a longitudinal cross-sectional view in the state where the rotary tool 40 for machining use is fixed by a known method, but the inside structure is not shown. Only the contours are shown. The tool holder 30 is of a type clamped from two surfaces, so has a tapered shank part 31 and a flange part 32 forming a positioning surface perpendicularly intersecting the rotational axis Rz. The tool holder 30 is clamped at the main spindle 12, as is well known, by insertion of the shank part 31 of the tool holder 30 into a corresponding shank insertion hole 17 provided at the main spindle 12 and pulling up the tool holder 30 by a draw bar 14 until the outer circumferential surface of the shank part 31 of the tool holder 30 and the inner circumferential surface of the shank insertion hole 17 closely contact each other and further the positioning surface of the flange part 32 of the tool holder 30, that is, the rear end face, closely contacts the distal end face 18 of the main spindle 12. Further, while changing the tool holder 30, the above-mentioned closely contacting surfaces are sprayed with coolant from a not shown coolant spray port so as to wash off any chip or other foreign matter which may deposit there.

The main spindle device 10 of the present embodiment is further provided with, for confirming seating, an air supply flow channel 21 for supplying the distal end face 18 of the main spindle 12 with compressed air from the inside, a pressure detector 22 detecting the pressure of the air supply flow channel 21, a compressed air source 23, a control device 24, and a not shown solenoid valve opening and closing the air supply flow channel 21. The air supply flow channel 21 is comprised of a pipe portion 21a from the compressed air source 23 to the support member 11, a support member inside part 21b formed at the inside of the support member 11, and a main spindle inside part 21c formed at the inside of the main spindle 12. An outlet 21d of the air supply flow channel 21 is formed as the outlet 21d of the main spindle inside part 21c. The outlet 21d of the air supply flow channel 21 opens in an annular recess 25 formed at the distal end face 18 of the main spindle 12 centered about the rotational axis Rz. The annular recess 25 is shown in FIG. 1B, more particular, is shown in FIGS. 3A-3B schematically explaining it.

The main spindle device 10 of the present embodiment is controlled so that, when the main spindle 12 stops, the rotational angle of the main spindle 12 is controlled by the control device 24 so that the outlet of the support member inside part 21b of the air supply flow channel 21 and the inlet of the main spindle inside part 21c are positioned in terms of angle. Furthermore, while not shown, an embodiment configured so that when the main spindle 12 is at a standstill, the outlet of the support member inside part 21b of the air supply flow channel 21 and the inlet of the main spindle inside part 21c closely contact each other, while when the main spindle 12 is rotating, they separate is also possible. In this case, the flow channel part of the air supply flow channel 21 including the outlet of the support member inside part 21b is formed inside a plunger (not shown) able to advance and retract in a direction perpendicular to the rotational axis Rz. The plunger is actuated to retract during rotation of the main spindle 12 and to advance and contact the main spindle 12 when the main spindle 12 stops.

Next, the annular recess 25 formed at the distal end face 18 of the main spindle 12 will be explained with reference to FIGS. 3A-3B. FIG. 3A is a view schematically showing the distal end face 18 of the main spindle 12, while FIG. 3B is a cross-sectional view laying out flat the cross-section curved by the line X-X extending in the circumferential direction in FIG. 3A. The annular recess 25 is formed so that when the tool holder 30 is attached to the main spindle 12, it is completely covered by the rear end face of the flange part 32 of the tool holder 30. The annular recess 25 has a relatively shallow first section 25a and a second section 25b deeper than the first section 25a. At the bottom surface of the second section 25b, a diameter 1.5 mm outlet 21d of the air supply flow channel 21 opens. In the present embodiment, a depth $D_1$ of the first section 25a is 0.3 mm, while a depth $D_2$ of the second section 25b is 0.5 mm. The widths of the first section 25a and second section 25b are both 1.8 mm. However, an embodiment differing in width W of the first section 25a and the second section 25b is also possible.

Figure 3A:
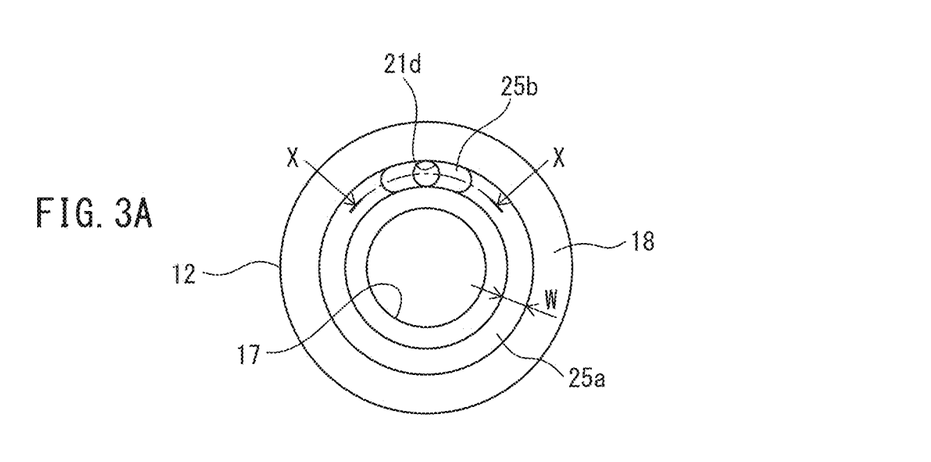
FIGS. 3A-3B give a distal end face view (FIG. 3A) schematically showing a distal end face of a main spindle of the main spindle device and a schematic longitudinal cross-sectional view (FIG. 3B) of the main spindle along the line X-X in (FIG. 3A).
Figure 3B:
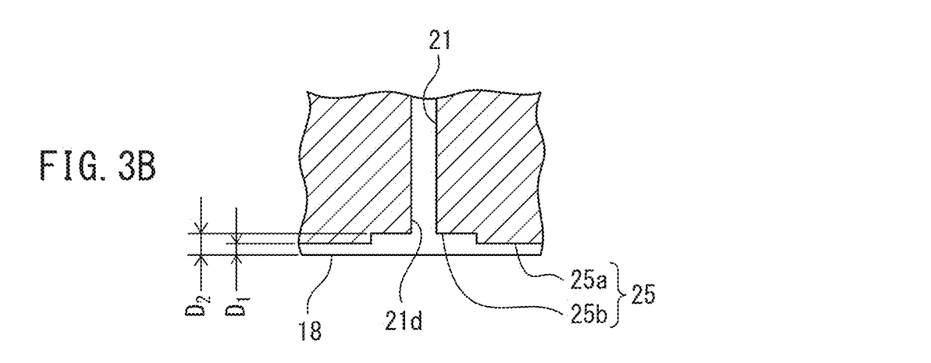

In the embodiment of FIGS. 3A-3B, the first section 25a has a considerably wide area in a plan view of about 5 times the second section 25b. The inventors of the present invention have discovered that this is because if the depth of the annular recess 25 is large, as explained later, the detection time or judgment time when thin foreign matter is interposed becomes longer. In other words, reducing the area of the considerably deep second section 25b enables the judgment time to be shortened.

Figure 4:
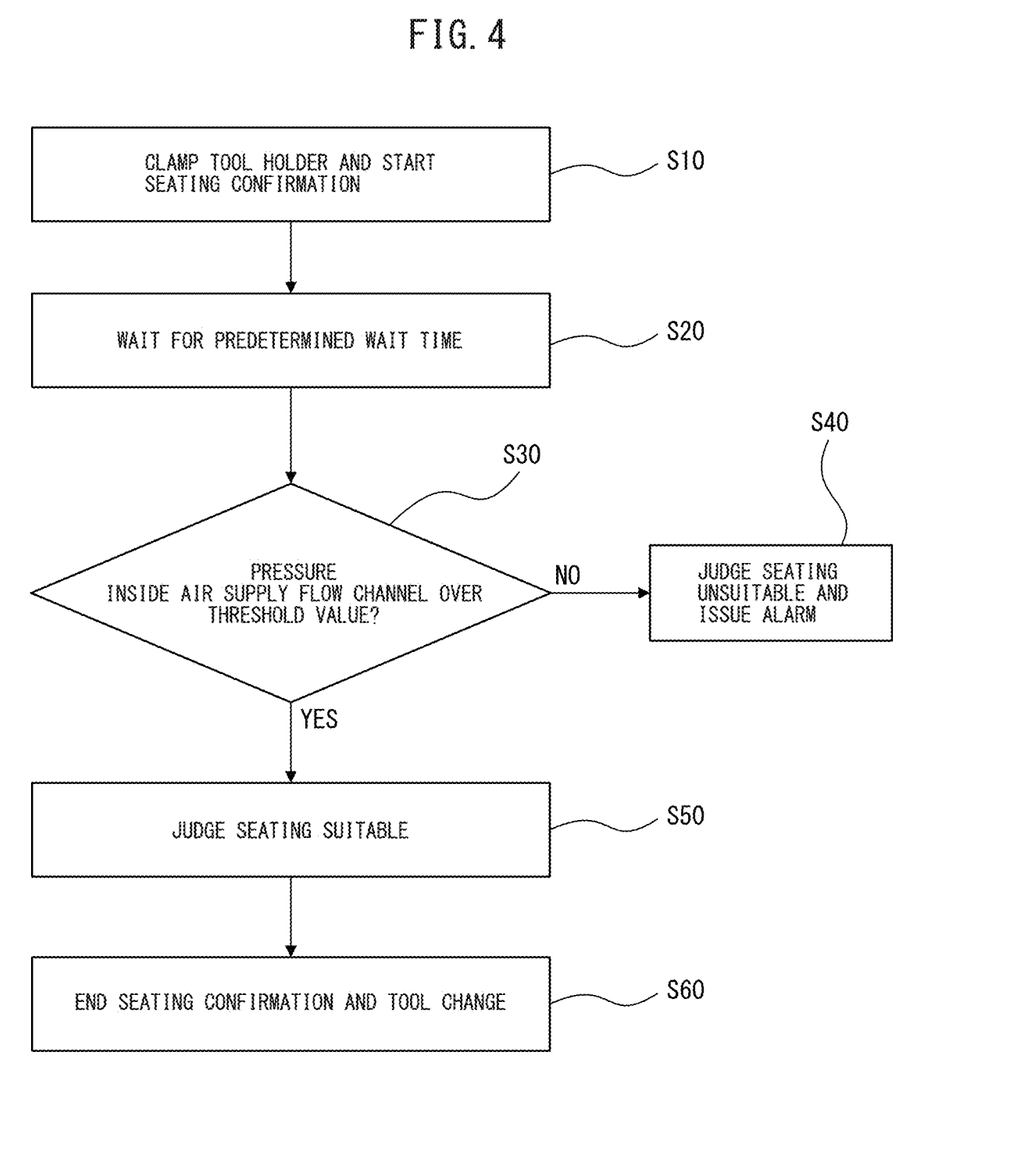
FIG. 4 is a flow chart of confirmation of seating of a tool holder.

Next, how the main spindle device 10 according to the present invention confirms seating will be explained with reference to the flow chart of FIG. 4.

The process of confirmation of seating is started by the main spindle 12 clamping the tool holder 30 (S10). Note that, in the present embodiment, compressed air continues to be supplied from before the process of confirmation of seating is started.

Next, in this state, a predetermined wait time is waited. The predetermined wait time is determined in accordance with the thickness of the smallest chip targeted for detection etc. (S20).

Next, the control device 24 judges if the air pressure in the air supply flow channel 21 detected by the pressure detector 22 has exceeded a predetermined threshold value (S30).

If the detected pressure is a predetermined threshold value or less, the control device 24 judges that the seating is unsuitable and emits an alarm (S40).

On the other hand, if the detected pressure is over the predetermined threshold value, the control device 24 judges that the seating is suitably performed (S50) and ends the seating confirmation step and tool changing step (S60).

Here, before explaining detail the action and effect of the main spindle device 10 of the present invention, the action and effect of an annular recess in a main spindle device (not shown) according to the first and second related art of the present invention will be explained referring to the graphs of FIGS. 9A-9B and FIGS. 10A-10B. Note that, the main spindle device of the first and second related art according to the present invention differ from the main spindle device 10 according to the embodiment of the present invention in only the configuration of the annular recess, so preparation of drawings is eliminated. For the reference notations of the component element, the ones of the main spindle device 10 are employed.

Figure 9A:
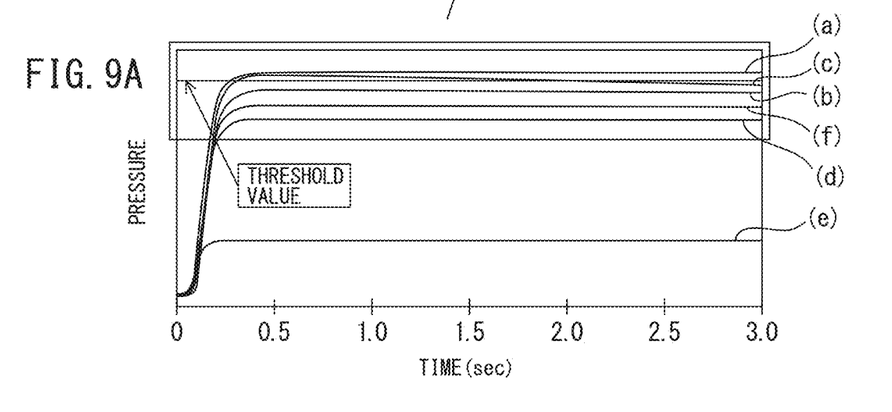
FIGS. 9A-9B show graphs showing changes along with time in air pressure inside an air supply flow channel when clamping a tool holder at a main spindle of a main spindle device according to a first related art of the present invention.
Figure 9B:
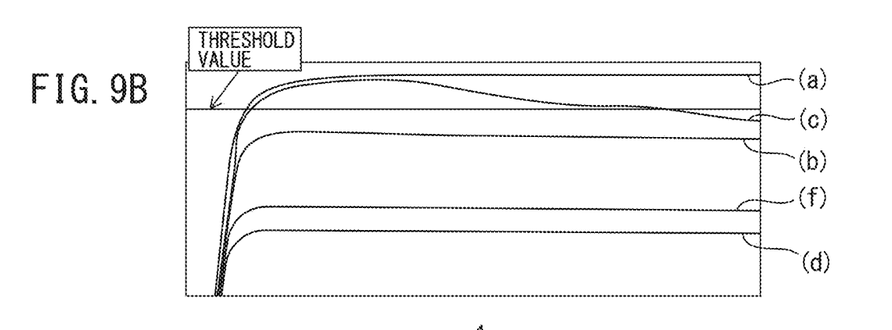

FIGS. 9A-9B show graphs showing the change along with time of the air pressure in the air supply flow channel 21 detected when seating and clamping the tool holder 30 to the main spindle 12 of the main spindle device according to the first related art of the present invention. The pressure of the ordinate is the pressure detected by the pressure detector 22. FIG. 9A shows the graph as a whole, FIG. 9B is an enlarged view of a relatively high pressure region of FIG. 9A. The main spindle device according to the first related art differs from the main spindle device 10 according to the present invention in the annular recess 25 formed at the distal end face 18 of the main spindle 12 not being provided with the second section 25b and being only comprised of the first section. The outlet 21d of the air supply flow channel 21 opens at the bottom surface of the annular recess 25. Further, the annular recess 25 is formed to a depth of 0.5 mm.

The six lines in the graphs in FIGS. 9A-9B show the following six types of conditions, that is:

(a) in a state of close contact with no foreign matter sandwiched;
(b) where a thickness 10 µm, width 12 mm iron sheet is attached to the distal end face 18 of the main spindle 12 so as to cover the outlet 21d of the air supply flow channel 21 and straddle the annular recess 25;
(c) where a thickness 10 µm, width 12 mm iron sheet is attached to the distal end face 18 of the main spindle 12 so as to straddle the annular recess 25 at the 180 degree opposite side from the outlet 21d of the air supply flow channel 21;
(d) where a thickness 20 µm, width 12 mm iron sheet is attached to the distal end face 18 of the main spindle 12 straddling the annular recess 25 at the 180 degree opposite side from the outlet 21d of the air supply flow channel 21;
(e) where a thickness about 50 µm, width about 3 mm aluminum alloy chip is deposited at the distal end face 18 of the main spindle 12 straddling the annular recess 25 close to the outlet 21d of the air supply flow channel 21 but so that the outlet 21d is not covered; and
(f) where a thickness about 50 µm, width about 3 mm aluminum alloy chip is deposited at the distal end face 18 of the main spindle 12 straddling the annular recess 25 so as to cover the outlet 21d of the air supply flow channel 21.

Note that, in this Description, the "thickness" of a chip indicates the thickness including bending and warping of the chip.

From FIGS. 9A-9B, it will be understood that the pressure rapidly rises due to the tool holder 30 being clamped while seated at the main spindle 12 and stabilizes at about 0.3 to 0.4 second. The pressure is the highest in the case of the condition (a) where the tool holder 30 is suitably seated at the main spindle 12 and the rear end face of the clamp of the tool holder 30 and the distal end face 18 of the main spindle 12 closely contact in state and is the lowest in the case of the condition (e) where the foreign matter interposed between the two surfaces is thick. In the case of the condition (f) where the foreign matter is thick and covers the outlet 21d of the air supply flow channel 21, the pressure becomes somewhat high, but does not reach the threshold value, so the presence of the foreign matter is detected.

On the other hand, in the case of the condition (c) where the foreign matter is thin and is interposed between the two surfaces at a location far from the outlet 21d of the air supply flow channel 21, the pressure exceeds the threshold value once and rises to a value substantially equal to the state of close contact (a), but after about 2.6 seconds, falls to the threshold value or less. Therefore, the presence of foreign matter is detected. However, in this way, about 2.6 seconds are required until correct results of detection are obtained, so the above-mentioned wait time may be set to for example 3 seconds with the addition of an extra margin. This 3 seconds of wait time is not a practical value for a user of a machine tool with a high tool changing frequency, but is a value where shortening is desired. In the case of the condition (c), the pressure rises once probably due to the coolant present in the annular recess 25. That is, due to the coolant present in the annular recess 25 obstructing the flow of air, the pressure temporarily rises, but it is believed the pressure falls as the coolant is expelled from the annular recess 25 by the compressed air.

Figure 10A:
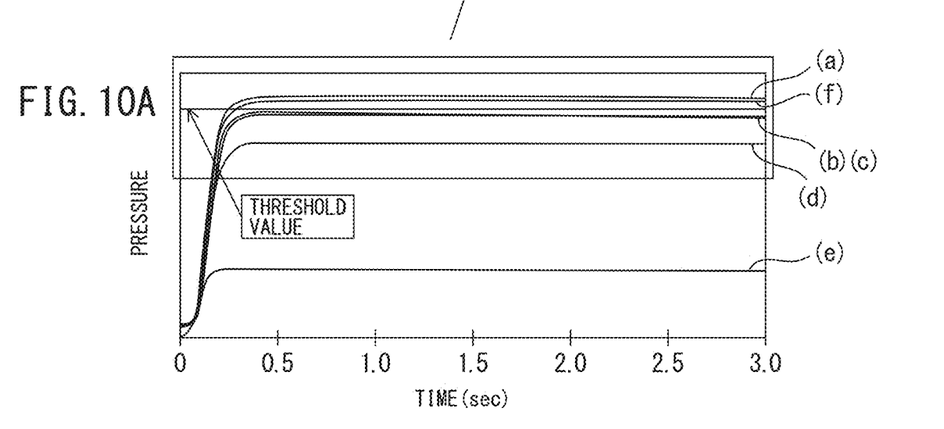
FIGS. 10A-10B show graphs showing changes along with time in air pressure inside an air supply flow channel when clamping a tool holder at a main spindle of a main spindle device according to a second related art of the present invention.
Figure 10B:
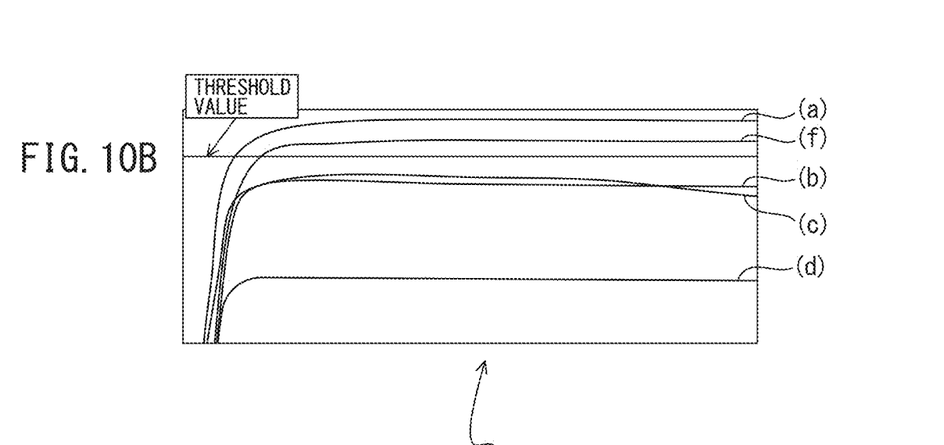

The action and effect of a main spindle device according to the second related art will be explained with reference to FIGS. 10A-10B. In the second related art, the annular recess 25 formed at the main spindle 12 does not have the second section 25b and only has the first section. The depth of the annular recess 25 is 0.5 mm in the first related art, but the depth of the annular recess 25 in the second related art is 0.3 mm. The rest of the configuration is equal to the first related art. FIGS. 10A-10B show a graph similar to FIGS. 9A-9B. The conditions (a) to (f) are also the same.

In FIGS. 10A-10B, unlike FIGS. 9A-9B, in the case of the condition (c) as well, the pressure will never exceed a threshold value. Therefore, it becomes possible to judge the interposition of thin 10 μm foreign matter in a short time, for example, even if shortening the wait time down to about 0.5 second. On the other hand, in FIGS. 10A-10B, in the case of the condition (f) causing the deposition of a thickness about 50 μm aluminum alloy chip so as to cover the outlet 21d of the air supply flow channel 21, despite foreign matter being sandwiched in, the pressure exceeds the threshold value and stabilizes. This is because a chip of aluminum alloy thicker than the depth of the annular recess 25 is pushed against the outlet 21d of the air supply flow channel 21 and block it. As a result, the problem arises of the control device 24 mistakenly finding that seating has been suitably performed.

Figure 5A:
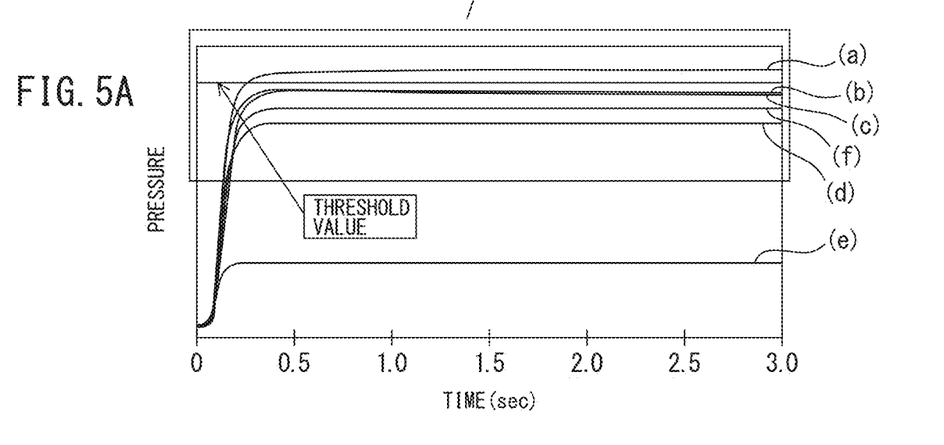
FIGS. 5A-5B show graphs showing a change along with time of air pressure in an air supply flow channel when clamping the tool holder at the main spindle of the main spindle device.
Figure 5B:
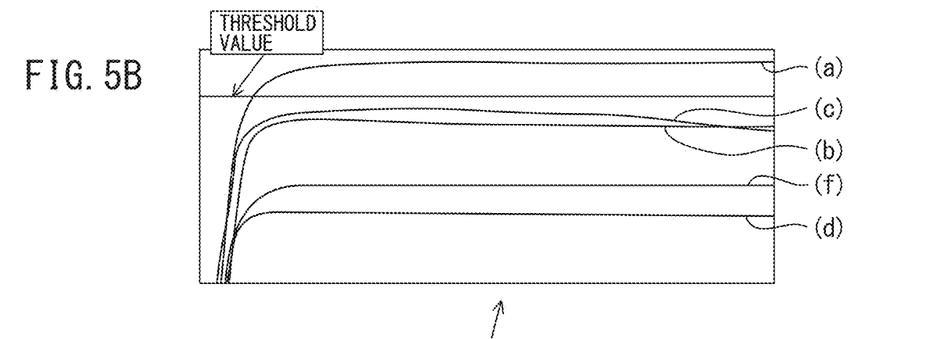

The rise in pressure in the main spindle device 10 according to the embodiment of the present invention will be explained using FIGS. 5A-5B similar to FIGS. 9A-9B and FIGS. 10A-10B. The annular recess 25 of the distal end face 18 of the main spindle 12 of the main spindle device 10, as explained above, is comprised of the first section 25a with the depth $D_1$ of 0.3 mm and the second section 25b with a relatively small area, but the depth $D_2$ of 0.5 mm deeper than the first section 25a, in which second section 25b, the outlet 21d of the air supply flow channel 21 opens. According to FIGS. 5A-5B, even in the case of the condition (c), which is a problem in the case of the first related art, the pressure never exceeds a threshold value. Therefore, interposition of foreign matter can be judged in a short time. Further, even in the case (f), which is a problem in the case of the second related art, the pressure will never exceed the threshold value. Therefore, seating being suitably performed will never be mistakenly recognized.

In this way, according to the main spindle device 10 according to the embodiment of the present invention, the effect of enabling even thin foreign matter to be detected in a short time and the effect of it becoming harder for the outlet 21d of the air supply flow channel 21 to be blocked by foreign matter covering the outlet 21d, which in the past were in a tradeoff relationship, can both be achieved. This is because, according to the present invention, by providing the second section 25b in the annular recess 25, the outlet 21d of the air supply flow channel 21 becomes harder to block, so the first section 25a can be made shallower.

A number of modifications of the main spindle device 10 according to the embodiment of the present invention will be explained below. In these modifications, the form of the second section of the annular recess of the main spindle 12 differs from that in the above-mentioned embodiment.

Figure 6A:
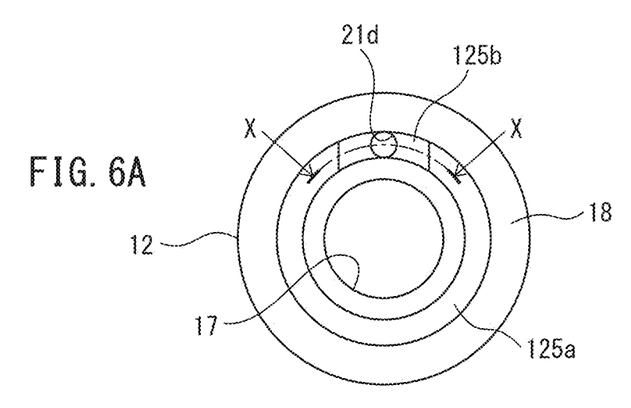
FIGS. 6A-6B give a distal end face view (FIG. 6A) schematically showing a distal end face of a main spindle of a first modification of the main spindle device according to the embodiment of the present invention and a schematic longitudinal cross-sectional view (FIG. 6B) of the main spindle along the line X-X in (FIG. 6A).
Figure 6B:
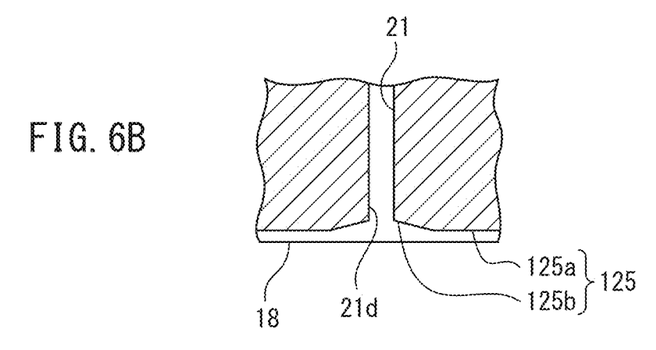

First, an annular recess 125 of a first modification will be explained with reference to FIGS. 6A-6B. FIG. 6A is a view schematically showing a distal end face 18 of the main spindle 12. FIG. 6B is a cross-sectional view laying out flat the cross-section curved by the line X-X extending in the circumferential direction in FIG. 6A. Here, the depth of the second section 125b of the annular recess 125, as shown in FIG. 6B, becomes gradually deeper the closer to the outlet 21d of the air supply flow channel 21.

Figure 7A:
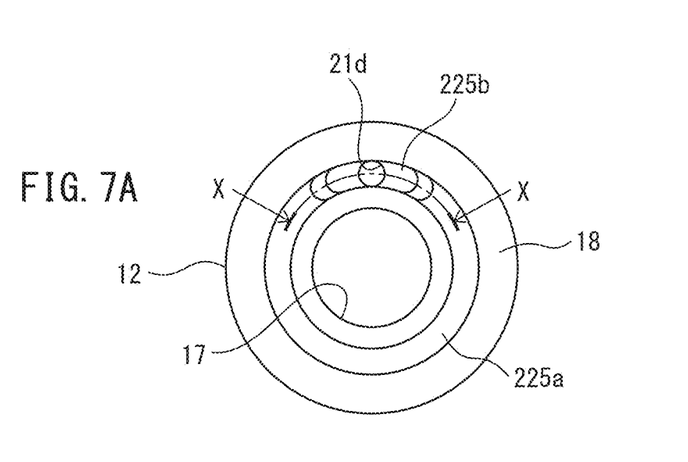
FIGS. 7A-7B give a distal end face view (FIG. 7A) schematically showing a distal end face of a main spindle of a second modification of the main spindle device according to the embodiment of the present invention and a schematic longitudinal cross-sectional view (FIG. 7B) of the main spindle along the line X-X in (FIG. 7A).
Figure 7B:
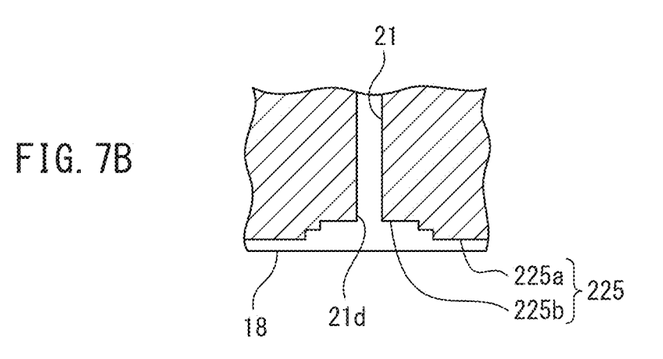

In a second modification, a second section 225b of an annular recess 225, as shown in FIGS. 7A-7B, is formed in steps so as to become deeper the close to the outlet 21d of the air supply flow channel 21. In FIGS. 7A-7B, one step is formed at the second section 225b, but several steps may also be formed.

Figure 8A:
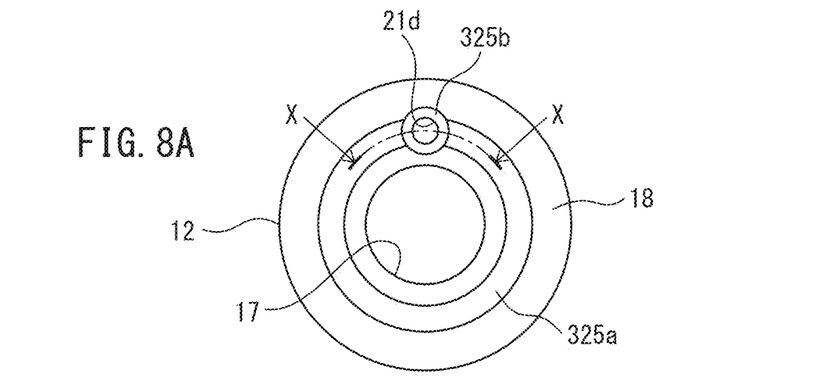
FIGS. 8A-8B give a distal end face view (FIG. 8A) schematically showing a distal end face of a main spindle of a third modification of the main spindle device according to the embodiment of the present invention and a schematic longitudinal cross-sectional view (FIG. 8B) of the main spindle along the line X-X in (FIG. 8A).
Figure 8B:
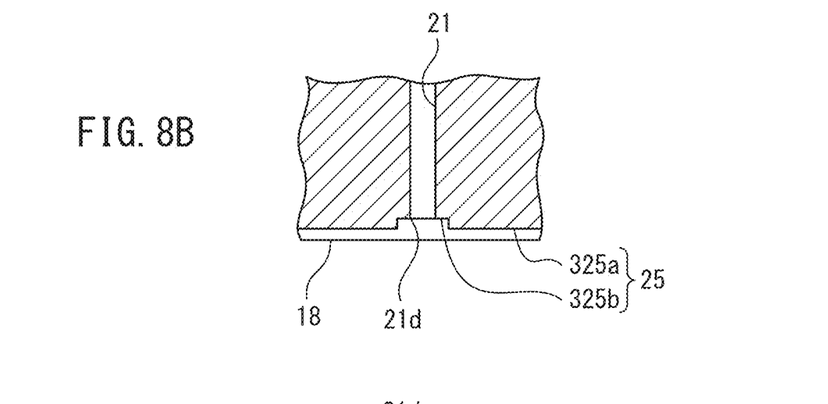

In a third modification, a second section 325b of an annular recess 325 is formed as a circular recess surrounding an outlet 21d of the air supply flow channel 21 such as shown in FIG. 8A-B.

A modification comprised of the above first to third modifications combined is also possible. For example, the first modification and third modification may be combined and the circular recess may be formed as a frustoconical recess becoming gradually deeper the closer to the outlet 21d of the air supply flow channel 21.

In the main spindle device 10 of the above-mentioned embodiment, compressed air is utilized to confirm seating, but an embodiment in which a compressed gas other than air, for example, nitrogen, argon, carbon dioxide, etc., is utilized is also possible in the present invention.

REFERENCE SIGNS LIST 10 main spindle device
12 main spindle
18 main spindle distal end face
21 air supply flow channel
21d outlet of air supply flow channel
22 pressure detector
25 annular recess
25a first section
25b second section
30 tool holder
32 flange of tool holder

The invention claimed is:

1. A main spindle device of a machine tool using compressed air to confirm seating of a tool holder, the main spindle device comprising:
   a main spindle having a distal end face which a flange end face of the tool holder closely contacts;
   an annular recess formed at the distal end face of the main spindle so as to be covered by the flange end face of the tool holder;
   an air supply flow channel connecting with the annular recess and supplying the annular recess with compressed air;
   a compressed air source supplying air to the air supply flow channel; and
   a pressure detector detecting pressure of the compressed air inside the air supply flow channel,
   wherein the annular recess has a first section and a second section, wherein the first section has a first bottom surface spaced from the distal end face of the main spindle, and the second section has a second bottom surface spaced from the distal end face of the main spindle,
   wherein a distance between the second bottom surface and the distal end face of the main spindle is greater than a distance between the first bottom surface and the distal end face of the main spindle, the air supply flow channel opening at the second section.

2. The main spindle device of a machine tool of claim 1, wherein the second section of the annular recess has an area in a plan view smaller than an area of the first section in the plan view.

3. The main spindle device of a machine tool of claim 1, wherein the second section of the annular recess is formed so as to become gradually deeper, relative to the distal end face of the main spindle, the closer the second section gets to the outlet of the air supply flow channel.

4. The main spindle device of a machine tool of claim 1, wherein the second section of the annular recess is formed in steps so as to become deeper, relative to the distal end face of the main spindle, the closer the second section gets to the outlet of the air supply flow channel.

5. The main spindle device of a machine tool of claim 1, wherein the second section of the annular recess is formed as a recess surrounding the outlet of the air supply flow channel.

6. The main spindle device of a machine tool of claim 1, wherein one outlet of the air supply flow channel is formed in the annular recess.

\* \* \* \* \*